United States Patent [19]

Abraham et al.

[11] Patent Number: 5,475,047

[45] Date of Patent: Dec. 12, 1995

[54] CARBOXYLIC ACID THICKENER HAVING IMPROVED PERFORMANCE UNDER ALKALINE CONDITIONS

[75] Inventors: Tonson Abraham, Elyria; William F. Masler, III, Hinckley, both of Ohio

[73] Assignee: The B. F. Goodrich Company, Akron, Ohio

[21] Appl. No.: 245,198

[22] Filed: May 17, 1994

[51] Int. Cl.$^6$ .................................................. C08F 8/40
[52] U.S. Cl. ........................ 524/436; 524/555; 525/328.2
[58] Field of Search ..................................... 524/436, 555

[56] References Cited

U.S. PATENT DOCUMENTS

| | | |
|---|---|---|
| 2,798,053 | 7/1957 | Brown . |
| 3,493,500 | 2/1970 | Volk et al. . |
| 3,726,288 | 4/1973 | Nowak et al. . |
| 4,395,524 | 7/1983 | Emmons et al. . |
| 4,423,199 | 12/1983 | Chang et al. . |
| 4,566,973 | 1/1986 | Masler, III et al. . |

FOREIGN PATENT DOCUMENTS 864311  4/1961  Switzerland .

*Primary Examiner*—Bernard Lipman
*Attorney, Agent, or Firm*—George W. Moxon, II

[57] ABSTRACT

An alkaline mixture of a cross-linked carboxylic acid copolymer having improved performance under alkaline conditions, such as a pH of 10 or higher which is a copolymer of a monomeric mixture of 6.5 to 97 phr of a carboxylic acid and 0.5 to 30 phr of an N-substituted acrylamide, such as isopropyl acrylamide, diacetone acrylamide, t-octylacrylamide, or t-butylacrylamide, which copolymer is cross-linked with 0.05 to 5 percent by weight based upon the weight of the copolymer of a polyunsaturated cross-linking agent, and an alkali or alkaline earth hydroxide, carbonate, phosphate or amine.

20 Claims, No Drawings

CARBOXYLIC ACID THICKENER HAVING IMPROVED PERFORMANCE UNDER ALKALINE CONDITIONS

BACKGROUND OF INVENTION

This invention relates to polycarboxylic acid polymeric thickeners, especially polyacrylic acid thickeners, having improved performance under alkaline conditions. The polymeric thickener is a crossed linked carboxylic acid copolymer with an N-substituted acrylamide, such as t-butyl acrylamide, diacetone acrylamide or t-octyl acrylamide.

Polyacrylic acid polymers made by free radical, precipitation polymerization are used in a wide variety of applications especially where it is necessary to thicken water or aqueous systems. Copolymers of N-substituted acrylamides are known, but not as cross-linked polymers, for use in thickening aqueous solutions. For example, U.S. Pat. No. 4,395,524 to W. D. Emmons et al. teaches a copolymer of acrylamide and N-substituted acrylamide, which is uncrosslinked, for use as flow modifiers in aqueous systems, which are also effective adsorbates from aqueous systems, particularly multiphase systems. U.S. Pat. No. 3,493,500 to Volk et al. teaches an acrylamide copolymer, with acrylic acid, which is not cross-linked, that is polymerized in an aqueous solution and that is used, e.g., as flocculents for raw sewage. British 864,311 describes the preparation and use of copolymers containing substituted acrylamides, which are not cross-linked, for use as fixatives for hair, and anti static coatings. U.S. Pat. No, 4,566,973 to W. F. Masler et al. teaches copolymers of acrylic acid and substituted acrylamide, which are not crosslinked and are used as scale inhibitors.

Crosslinked acrylic acid polymers are known, such as for example, U.S. Pat. No. 2,798,053 to H. P. Brown, which discloses acrylic acid polymerized with acrylamides, but does not teach t-butyl acrylamide and teaches polymers useful as cation exchange resins or bulk laxatives. U.S. Pat. No. 3,726,288 teaches a copolymer thickener which comprises three components, namely carboxylic acid, an amide, and a cross-linker and is also used as a fixative for setting hair. U.S. Pat. No. 4,423,199 to C. J. Chang et al. teaches a paint thickener for paint lattices, cosmetic preparations, food preparations, ionic detergents, dye paste, and oil well drilling muds, which comprises a copolymer of (meth)acrylic acid, N-substituted acrylamide, and an alkyl (meth)acrylate. An optional cross-linker is taught, but no cross-linked polymers are used in the examples.

SUMMARY OF INVENTION

This invention has resulted from the discovery that cross-linked copolymers of carboxylic acid and N-substituted acrylamides, especially those selected from t-butyl acrylamide, diacetone acrylamide, isopropyl acrylamide and t-octylacrylamide, unexpectedly are useful for thickening aqueous solutions, mixtures or systems, having higher performance requirements under alkaline conditions. This is especially true in high pH conditions such as pH of 10 or higher, or even a pH of 12 and higher. This is contrasted to usual applications for crosslinked acrylic acid thickeners where the pH normally is between 7 and 9.

DETAILED DESCRIPTION OF INVENTION

This invention is directed to cross-linked copolymers of carboxyl containing monomers, such as acrylic acid and an N-substituted acrylamide, which are precipitation polymerized in an organic solvent. The N-substituted acrylamide is described by the formula

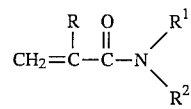

where R is H or $CH_3$, $R^1$ is H or alkyl, and $R^2$ is alkyl of the formula

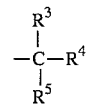

where no more than one of $R^3$, $R^4$ or $R^5$ can be H and the total carbons is between 3 and 30, preferably 3–18, with 12 and 3–8 being further preferred. Preferred N-substituted acrylamides include t-butylacrylamide, diacetone acrylamide, isopropyl acrylamide and t-octylacrylamide, with t-butyl acrylamide being further preferred.

Polymerization of the carboxyl-containing and acrylamide monomers, optionally with other vinylidene comonomers, is usually carried out in the presence of a free radical catalyst in a closed vessel in an inert atmosphere under autogenous or artificially-induced pressure, or in an open vessel in an inert atmosphere optionally under reflux at atmospheric pressure. The temperature of the polymerization may be varied from about 0° to 125° C. or lower or higher. Polymerization at 25° to 90° C. using a free radical catalyst is generally effective in providing monomer to polymer conversions of 75 percent to 100 percent.

In the practice of the invention, the polymerizations may be either batch, semi-batch or continuous. The agitation may be any agitation sufficient to maintain the slurry and obtain effective heat transfer including, for example, helical agitation, pitched turbines and the like. A useful reaction temperature range is from the range of 20° C. to 90° C. at about 1 atmosphere or more. Normal polymerization time is from about 3 to 12 hours.

Typical free-radical forming catalysts include peroxygen compounds such as sodium, potassium and ammonium persulfates, caprylyl peroxide, benzoyl peroxide, hydrogen peroxide, pelargonyl peroxide, cumene hydroperoxides, diisopropyl peroxydicarbonate, tertiary butyl diperphthalate, tertiary butyl perbenzoate, t-butyl peracetate, di-(2-ethylhexyl) peroxy dicarbonate, and the like; as well as azo catalysts such as azobis(isobutyronitrile). Other catalysts utilizable are the so-called "redox" type of catalyst and the heavy-metal activated catalyst systems. Ultraviolet light may also be used to generate free radicals. Some systems polymerize solely by heat, but catalysts generally provide better control. The monomers may be batch charged or continuously added during the course of polymerization or by any other manner of polymerization techniques conventionally used.

The polymerization reactions described herein are normally conducted in inert diluents that have a solubilizing effect on one or more of the monomeric ingredients but substantially none on the resulting polymers. Stated differently, the medium used for the polymerization is an organic fluid, or mixtures of organic fluids, in which the monomers are preferably soluble but in which the polymer is substantially insoluble, so that the polymer product is preferably obtained as a fine friable or fluffy precipitate. Typical monomer solvents include liquid hydrocarbons selected from alkanes of 5 to 10 carbon atoms, preferably 6 to 8 carbon atoms, such as hexane and heptane; cycloalkanes of 4 to 8 carbon atoms, preferably 5 to 7 carbon atoms, such as cyclohexane; benzene and alkyl-substituted benzenes containing 1 to 2 lower alkyl substituents, preferably methyl substituents, such as toluene and xylene; alkyl carboxylates containing 1 to 6 carbon atoms preferably 1 to 4 carbon atoms in the alkyl groups and 2 to 6 carbon atoms, preferably 2 to 4 carbon atoms in the carboxylate moiety, such as ethyl acetate, isopropyl acetate, propyl acetate, methyl acetate, and butyl acetate; haloalkanes and chlorofluoroalkanes, containing 1 to 3 carbon atoms and at least 2 halo groups, such as methylene chloride, ethylene dichloride, and 1,1,1-trichloroethane; ketones; and mineral spirits with a flash point greater than about 130° F. or mineral oil.

The amount of organic liquid solvent used normally will be in excess of the components to be polymerized and the proportion may vary from at least 1 weight percent of the components and 99 percent solvent up to about 65 weight percent polymerizable components and 35 weight percent solvent. More normally, a concentration of about 10 to 60 percent components is employed, where the weight percent is based on the total amount of ingredients charged to vessel. In the present application, a concentration of 10 to 50 percent, based upon the vinylic monomers is preferred.

The carboxyl containing polymers are prepared from monomers containing at least one activated >C=C< group and carboxyl group, such as acrylic acid, methacrylic acid, maleic acid, itaconic acid, maleic anhydride, and the like, and polymerizable N-substituted acrylamide monomers optionally with acrylate esters, acrylamides, olefins, vinyl esters, vinyl ethers, or styrenics.

The carboxylic monomers are the olefinically-unsaturated carboxylic acids containing at least one activated carbon-to-carbon olefinic double bond, and at least one carboxyl group; that is, an acid or function readily convened to an acid containing an olefinic double bond which readily functions in polymerization because of its presence in the monomer molecule, either in the alpha-beta position with respect to a carboxyl group, —C=C—COOH; or as part of a terminal methylene grouping, $CH_2$=C<. Olefinically-unsaturated acids of this class include such materials as the acrylic acids typified by the acrylic acid itself, alpha-cyano acrylic acid, beta methylacrylic acid (crotonic acid), alpha-phenyl acrylic acid, beta-acryloxy propionic acid, cinnamic acid, p-chloro cinnamic acid, 1-carboxy-4-phenyl butadiene-1,3, itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same carboxylic acid molecule. Maleic anhydride and other acid anhydrides useful herein have the general structure

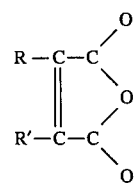

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers are the monoolefinic acrylic acids having the general structure

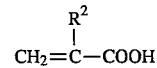

wherein $R^2$ is a substituent selected from the class consisting of hydrogen, halogen, and the cyanogen (—C≡N) groups, monovalent alkyl radicals. Of this class, acrylic and methacrylic acid are most preferred. Other useful carboxylic monomers are maleic acid and its anhydride.

The polymers include carboxylic acids, or anhydrides thereof, copolymerized with one or more other vinylidene monomers containing at least one terminal >$CH_2$ group. The other vinylidene monomers are present in an amount of less than 30 weight percent based upon the weight of the carboxylic acid or anhydride plus the vinylidene monomer(s). Such monomers include, for example, acrylate ester monomers including those acrylic acid ester monomers such as derivatives of an acrylic acid represented by the formula

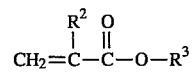

wherein $R^3$ is an alkyl group having from 1 to 30 carbon atoms, preferably 1 to 20 carbon atoms and $R_2$ is hydrogen, methyl or ethyl, present in the copolymer in amount, for example, from about 1 to 40 weight percent or more. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl methacrylate, nonyl acrylate, hexyl acrylate, n-hexyl methacrylate, and the like. Higher alkyl acrylic esters are decyl acrylate, isodecyl methacrylate, lauryl acrylate, stearyl acrylate, behenyl acrylate and melissyl acrylate. Mixtures of two or three or more long chain acrylic esters may be successfully polymerized with one of the carboxylic monomers. Other comonomers include olefins, including alpha olefins, vinyl ethers, vinyl esters, and mixtures thereof.

The polymers also may be cross-linked with any polyene, e.g. decadiene or trivinyl cyclohexane; acrylamides, such as methylene bis acrylamide; polyfunctional acrylates, such as trimethylol propane triacrylate; or polyfunctional vinylidene monomer containing at least 2 terminal $CH_2$< groups, including for example, butadiene, isoprene, divinyl benzene, divinyl naphthalene, allyl acrylates and the like. Particularly useful cross-linking monomers for use in preparing the copolymers are polyalkenyl polyethers having more than one alkenyl ether grouping per molecule. The most useful possess alkenyl groups in which an olefinic double bond is present attached to a terminal methylene grouping, $CH_2$=C<. They are made by the etherification of a polyhydric alcohol containing at least 2 carbon atoms and at least 2 hydroxyl groups. Compounds of this class may be produced by reacting an alkenyl halide, such as allyl chloride or allyl bromide, with a strongly alkaline aqueous solution of one or more polyhydric alcohols. The product may be a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include for example, diallyl esters, dimethallyl ethers, allyl or methallyl acrylates and acrylamides, tetraallyl tin, tetravinyl silane, polyalkenyl methanes, diacrylates, and dimethacrylates, divinyl compounds such as divinyl benzene, polyallyl phosphate, diallyloxy compounds and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, ethylene diacrylate, ethylene dimethacrylate, triethylene glycol dimethacrylate, and the like. Allyl pentaerythritol, trimethylolpropane diallylether and allyl sucrose provide excellent polymers. When the cross-linking agent is present, the polymeric mixtures usually contain up to about 5% or more by weight of cross-linking monomer based on the total of carboxylic acid monomer, plus other monomers, if present, and more preferably about 0.01 to 5.0 weight percent.

Acrylic amides containing from 3 to 35 carbon atoms including monoolefinically unsaturated amides also may be used. Representative amides include N-t-butyl acrylamide, isopropyl acrylamide, N-cyclohexyl acrylamide, higher alkyl amides, where the alkyl group on the nitrogen contains from 8 to 32 carbon atoms, acrylic amides including N-propanol acrylamide. Still further useful materials are alpha-olefins containing from 2 to 18 carbon atoms, more preferably from 2 to 8 carbon atoms; vinyl aromatics such as styrene, methyl styrene and chloro-styrene; divinyls, diacrylates and other polyfunctional monomers such as divinyl ether, diethylene glycol diacrylate, ethylene glycol dimethacrylate, methylene-bis-acrylamide, allylpentaerythritol, and the like.

TYPICAL EXAMPLES

In order to illustrate the present invention, a polymerization reaction was conducted in a water jacketed two liter Pyrex resin kettle equipped with mechanical stirrer, a thermometer and reflux condenser topped with a nitrogen inlet connected to a bubbler to provide a slightly positive pressure of nitrogen throughout the polymerization. The water jacket was connected to a constant temperature circulator. In producing an acrylic acid/N-substituted acrylamide copolymer, the resin kettle was charged with ethyl acetate (638 grams), cyclohexane (543 grams), acrylic acid (91.00 grams), an N-substituted acrylamide, such as t-butyl acrylamide (39.00 grams), and a cross-linking monomer, such as allylpentaerythritol (1.95 grams) based upon the weight of the acrylic acid and acrylamide monomers (i.e., phm or parts per hundred monomers). When tertiary or t-butyl acrylamide is employed as a monomer, it usually predissolved in inhibited glacial acrylic acid, since t-butyl acrylamide is usually a solid. Further, the total amount of monomers is about 130 grams with the ratio of acrylic acid to acrylamide being varied to illustrate various combinations. The mixture was sparged with nitrogen for 30 minutes while the reactor was heated to 45° C. At 45° C., the sparging tube was removed while a nitrogen purge was maintained, stirring was begun, and the recipe amount of di-(2-ethylhexyl)-peroxydicarbonate (in an amount of between about 0.275 to about 0.98 grams) was added. Polymerization was evident in a manner of minutes as the solution became hazy with precipitated polymer. If polymerization did not start within 15 minutes, the mixture was resparged. As the polymerization proceeded, the polymer slurry viscosity increased, and the speed of the paddle mixer had to be increased in order to maintain efficient stirring. After several hours the mixture had become a thick slurry, and the polymerization was continued for a total of 8 hours. The polymer slurry was then transferred to a single neck flask and the solvent was removed by flash evaporator at about 105° C. at 4 inches of mercury vacuum for 20 hours. The resulting dry polymer product was a fine white powder. When dispersed in water, the polymer began to hydrate, and when neutralized, resulted in thickened aqueous solutions. The results of the polymers in accordance with the present invention are reported in Table I, where the following terms are used:

AA is acrylic acid.

t-BAm is tertiary butyl acrylamide.

DAm is diacetone acrylamide.

t-OAm is tertiary octylacrylamide

APE is allylpentaerythritol.

POLYMER CHARACTERIZATION

To characterize the resin in terms of its usefulness for dispersing and thickening, tests were made to determine the ability of the resin to thicken by measuring its Neutralized Viscosity at 1.0 percent resin content mucilage; and its viscosity in 1% in 2.2N KOH, which is referred to as its Alkaline Viscosity.

The characterization data was obtained using one or more of the following procedures:

Neutralized Viscosity

A 1% stock dispersion of polymer (8 g resin/792 g water) was prepared in demineralized (DM) water, using a Lightnin' mixer at 1,000 rpm with a 3-blade marine impeller. The resin was introduced through a 20 mesh screen with stirring and the dispersion was mixed for a total of one hour. The 1% stock dispersion was then used to make a 1.0% mucilage, with 400 g of stock dispersion used as is. The dispersion was neutralized to pH 7.3–7.8 with 18% NaOH using an S-paddle at 300 rpm for 3–5 minutes, after which the mucilages were allowed to stand at room temperature for at least 30 minutes. The sample was then measured for pH and Brookfield Viscosity using a Brookfield RVT-DV Viscometer at 20 rpm. The viscosity of the neutralized dispersions is referred to as the Mucilage Viscosity. A Mucilage Viscosity of more than 20,000 cPs at 1.0% polymer concentration is desirable.

Alkaline Sensitivity

Alkaline sensitivity on 1.0% mucilages are evaluated at 1% polymer concentration in 2.2 Normal (N) potassium hydroxide (KOH) concentrations in the following manner:

Using the same sample from the Neutralized Viscosity study, KOH is added with stirring using an S-paddle at 300 rpm for 3–5 minutes. The KOH is added as a 45.8 weight percent solution, and results in an aqueous solution having a pH of about 12 to 14. The Brookfield Viscosities are read after additions. The results are reported as Alkaline Sensitivity Viscosity. A high viscosity is desirable since it shows that there is not a severe impairment of the viscosity by the alkaline.

There is no criticality in the source of the alkalinity and so it is intended to include all alkali and alkaline earth hydroxides, carbonates, phosphates and amines. Alkali hydroxides such as potassium hydroxide are preferred. The amount will vary depending on the alkaline source, but will result in a high alkaline condition which is a pH of 10 or higher, or even a pH of 12 or higher.

TABLE I

| Polymer* | Cross Linker (phm) | 1% Mucilage Viscosity (cPs) | Alkaline Viscosity |
|---|---|---|---|
| Carbopol 940** | — | 62,000 | 1190 |
| Carbopol 980 | — | 67,000 | 740 |
| AA/5% t-BAm | 1.4 APE | 80,000 | 545 |
| AA/100% t-BAm | 1.4 APE | 72,000 | 1340 |
| AA/100% t-BAm | 1.35 APE | 60,000 | 1400 |
| AA/15% t-BAm | 1.46 APE | 48,000 | 1330 |
| AA/15% t-BAm | 1.70 APE | 80,500 | 1100 |
| AA/20% t-BAm | 1.9 APE | 90,000 | 1620 |
| AA/20% t-BAm | 1.46 APE | 35,000 | 1270 |
| AA/30% t-BAm | 1.5 APE | 28,600 | 3240 |
| AA/5% DAAm | 1.4 APE | 87,000 | 705 |
| AA/13% DAAm | 1.36 APE | 78,000 | 1300 |
| AA/13.8% t-OAm | 1.34 APE | 46,000 | 1690 |

**Polymerized in benzene solvent.?
*The combined monomers equal 100% by weight based upon the weight of the monomers.

The foregoing embodiments of the present invention have been presented for purposes of illustration and description. These description and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

We claim:

1. An alkaline mixture comprising a cross-linked carboxylic acid copolymer having improved performance under alkaline conditions comprising a copolymer of a monomeric mixture of 65 to 97 phr of a carboxylic acid monomer and 0.5 to 30 phr of an N-substituted acrylamide monomer selected from the group consisting of t-butyl acrylamide, t-octyl acrylamide, diacetone acrylamide, and isopropyl acrylamide, said copolymer being cross-linked with 0.05 to 5 percent by weight based upon the weight of the copolymer of a polyunsaturated cross-linking agent and an alkali or alkaline earth hydroxide, carbonate, phosphate or amine wherein the mixture has a pH of greater than about 10.

2. The copolymer of claim 1 wherein the carboxylic acid is acrylic acid.

3. The copolymer of claim 1 wherein the substituted acrylamide is an N-substituted acrylic acid amide of the formula:

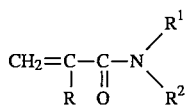

in which R represents a hydrogen atom or an alkyl group containing 1 or 2 carbon atoms, $R_1$ represents a hydrogen atom or an alkyl substituent, and $R_2$ represents an organic substituent, and in which, when $R_1$ represents a hydrogen atom, the substituent $R_2$ is bound to the amide nitrogen atom through a secondary or tertiary carbon atom and contains between 3 and 30 carbon atoms.

4. The copolymer of claim 3 wherein $R_2$ contains between 3 and 18 carbon atoms.

5. The copolymer of claim 3 wherein $R_2$ contains between 3 and 12 carbon atoms.

6. The copolymer of claim 1 wherein said cross-link is selected from allyl ethers of polyols.

7. The copolymer of claim 1 wherein said acrylamide is t-butyl acrylamide.

8. The copolymer of claim 1 wherein said acrylamide is diacetone acrylamide.

9. The copolymer of claim 1 wherein said acrylamide is t-octyl acrylamide.

10. The copolymer of claim 1 wherein said acrylamide is isopropyl acrylamide.

11. The mixture of claim 1 wherein the mixture has a pH of greater than about 12.

12. A process of thickening aqueous alkaline mixtures comprising adding to an aqueous alkaline mixture a copolymer of a monomeric mixture of 65 to 97 parts per hundred monomer of a carboxylic acid monomer and 0.5 to 30 parts per hundred monomer of an N-substituted acrylamide selected from the group consisting of t-butyl acrylamide, t-octyl acrylamide, diacetone acrylamile, and isopropyl acrylamide, said copolymer being cross-linked with 0.05 to 5 percent by weight, based upon the weight of the copolymer, of a polyunsaturated cross-linking agent wherein the mixture has a pH of greater than about 10.

13. The process of claim 12 wherein the carboxylic acid is acrylic acid.

14. The process of claim 12 wherein the substituted acrylamide is an N-substituted acrylic acid amide of the formula:

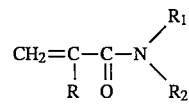

in which R represents a hydrogen atom or an alkyl group containing 1 or 2 carbon atoms, $R_1$ represents a hydrogen atom or an alkyl substituent, and $R_2$ represents an organic substituent, and in which, when $R_1$ represents a hydrogen atom, the substituent $R_2$ is bound to the amide nitrogen atom through a secondary or tertiary carbon atom and contains between 3 and 30 carbon atoms.

15. The process of claim 14 wherein $R_2$ contains between 3 and 18 carbon atoms.

16. The process of claim 14 wherein $R_2$ contains between 3 and 12 carbon atoms.

17. The process of claim 12 wherein said acrylamide is diacetone acrylamide.

18. The process of claim 12 wherein said acrylamide is t-octyl acrylamide.

19. The process of claim 12 wherein said acrylamide is isopropyl acrylamide.

20. The process of claim 12 wherein the mixture has a pH of greater than about 12.

* * * * *